UNITED STATES PATENT OFFICE.

EUGEN FELIX GEORG HARTMANN, OF BERLIN, ASSIGNOR TO GEBR. STOLLWERCK, OF COLOGNE, GERMANY.

SOLUBLE COCOA.

SPECIFICATION forming part of Letters Patent No. 273,975, dated March 13, 1883.

Application filed January 2, 1883. (No specimens.)

*To all whom it may concern:*

Be it known that I, EUGEN FELIX GEORG HARTMANN, a subject of the Emperor of Germany, and a resident of Berlin, in the Kingdom of Prussia and German Empire, have invented certain new and useful Improvements in the Manufacture of Cocoa, of which the following is a specification.

My present invention consists in certain improvements upon the subject-matter of an application filed by me upon the 17th day of October, A. D. 1882, and which will be patented the 16th day of January, 1883.

The object of my invention is to manufacture an easily soluble cocoa compound, which I term "cocoa-paste," by means of a process which in certain respects constitutes an improvement upon the process set forth in the specification forming part of the application for United States Letters Patent named above.

The several processes heretofore employed for the manufacture of cocoa, together with the objections attending each, are fully described in the application mentioned above, and will not therefore be repeated here. I will therefore proceed to describe my improved process of manufacture, which consists substantially in the method of procedure hereinafter set forth.

By the process described in my application of October 17, 1882, the cocoa-beans after being roasted and having their hulls removed, are first ground in any suitable mill generally used for the purpose, their temperature during this process being from 140° to 180° Fahrenheit. After being ground they are put, while yet warm and soft, into bags of strong cloth and subjected to hydraulic pressure, to remove from them the greater part of their oleaginous matter, the press used for the purpose being so constructed that it may be heated. To the remaining mass, while it is yet in a warm state, I add ten to twenty per cent. of cold or hot water, with which has been previously mingled a proper proportion of milk or sugar, and by means of kneading I thoroughly mix the cocoa with the water and milk, or the water and sugar; or the latter may be added before the pulverized cocoa has been subjected to the action of the hydraulic press. Moreover, I may first mix the pulverized mass with part only of the compound of water and milk, or water and sugar, pressing the mass, and then, after its pressure, add to the remaining mass the rest of the compound, thoroughly mingling the two by kneading, after which the mass may be allowed to dry quickly and subsequently pulverized. By mingling with the substance obtained by subjecting the mass to pressure cocoa softened by means of heat or pulverized I obtain a chocolate-paste from which a ready water or milk chocolate drink can be made by simply pouring on hot water.

For preparing chocolate-paste intended for milk-chocolate, I propose to use chiefly condensed milk dissolved in only a little water, and I propose to either pulverize the mass thus obtained or to form it into solid pieces or prepare it in a dough-like state to be put into proper receptacles of any suitable kind. By the use of water containing a solution of sugar the cocoa will most readily unite to form a homogeneous chocolate-paste, which may also be pulverized, formed into solid pieces, or kneaded into suitable receptacles of any desired shape. In the latter case by simply pouring on hot milk a ready milk-chocolate drink may be obtained, while a like use of hot water will produce a water-chocolate drink. Sugar may be added to the cocoa also before the latter has been treated with water or milk, for the purpose of increasing its solubility.

In preparing the chocolate-paste, also, vanilla or any other seasoning may be added—as, for example, extract of meat, leguminose, malt, &c. The relative proportions of water, milk, sugar, cocoa, &c., employed in mixing are governed entirely by taste, the most preferable proportion for milk-chocolate being thirty-five (35) parts, by weight, of cocoa-powder, fifty parts, by weight, of condensed milk, ten parts, by weight, of sugar, and fifteen parts, by weight, of water. The most suitable proportions for a water-chocolate would be forty-five parts, by weight, of cocoa-powder, fifty parts, by weight, of sugar, and fifteen parts, by weight, of water.

The readily-soluble quality of the chocolate-paste is the same as already described, with reference to pure cocoa-powder in my former application hereinbefore mentioned, and is entirely due to the action of the water mingled with the milk or the sugar in the manner already described.

Having thus described my invention, what I claim is—

1. As a new article of manufacture, a soft pulverized or solid chocolate-paste, readily soluble in either milk or water, said paste being composed of softened or pulverized cocoa mingled with sugar and water or with milk, substantially as described.

2. The process hereinbefore described of manufacturing a readily-soluble chocolate-paste, said process consisting in pulverizing the bean and mingling with the softened or pulverized product sugar and water or milk only, substantially as described.

In testimony whereof I have signed my name to this specification in the presence of two subscribing witnesses.

EUGEN FELIX GEORG HARTMANN.

Witnesses:
ROBERT R. SCHMIDT,
B. ROI.